Figure 1:
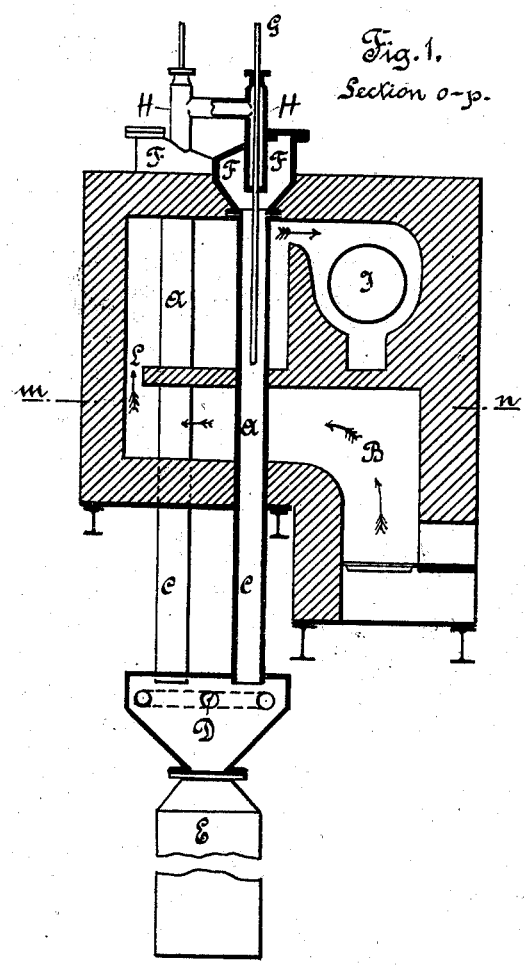

(No Model.)

W. SIEPERMANN.
PROCESS OF AND APPARATUS FOR MAKING CYANIDES.

No. 509,957. Patented Dec. 5, 1893.

Section o-p.

Section m-n.

Attest
Inventor
W. Siepermann
by Richards & Co.
Att'ys

UNITED STATES PATENT OFFICE.

WILHELM SIEPERMANN, OF LEOPOLDSHALL, ASSIGNOR TO THE STASS-FURTER CHEMISCHE FABRIK, VORMALS VORSTER & GRÜNEBERG ACTIEN-GESELLSCHAFT, OF STASSFURT, GERMANY.

PROCESS OF AND APPARATUS FOR MAKING CYANIDES.

SPECIFICATION forming part of Letters Patent No. 509,957, dated December 5, 1893.

Application filed August 30, 1892. Serial No. 444,546. (No model.) Patented in Germany March 10, 1886, No. 38,012; in Austria-Hungary June 28, 1888, No. 7,329 and No. 19,335, and April 23, 1890, No. 840 and No. 14,266; in England August 30, 1889, No. 13,697, and in France August 30, 1889, No. 220,492.

*To all whom it may concern:*

Be it known that I, WILHELM SIEPERMANN, a subject of the King of Prussia, residing at Elberfeld, formerly at Leopoldshall, in the Duchy of Anhalt, Germany, have invented a new and useful Improvement in Processes of and Apparatus for the Production of the Cyanates and Cyanides of the Alkali Metals; and I do declare the following to be a full, clear, and exact description of the same.

This invention has been patented to me in Austria-Hungary, No. 7,329 and No. 19,335, dated June 28, 1888, and No. 840 and No. 14,266, dated April 23, 1890; in France, No. 220,492, dated August 30, 1889; in Great Britain, No. 13,697, dated August 30, 1889; in Germany, No. 38,012, dated March 10, 1886, and patent of addition, No. 51,562, dated August 7, 1889.

For the production of the cyanates of the alkali metals, alkaline carbonates are mixed with any indifferent substance, as for instance carbonate of baryta, &c., in order to spread the particles of the alkaline carbonate over a large surface and the mixture is introduced into a tube which is heated to a dark red heat— 500° to 800° Celsius—and at this temperature the mixture is subjected to the action of ammonia or ammoniacal gases. Under the influence of this dark red heat the ammonia acts upon the alkaline carbonates, forming cyanates and caustic alkalies and water being elminated:

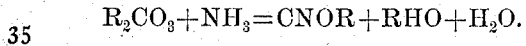

The dark red heat aimed at is essential because at a bright red heat water acts on the cyanates, carbonates of the alkali metals, nitrogen carbonic acid and hydrogen being formed.

The reaction between the alkaline carbonate and the ammonia at a dark red heat being completed the hot mass is removed out of the tube and after cooling exhausted with alcohol and the cyanates of the alkalies separated from this solution by crystallization.

In order to produce the cyanids of the alkali metals the alkaline carbonates are mixed with powdered charcoal and ammonia conducted over this mixture in a tube heated to a dark red heat, at which temperature the charcoal takes little or no part in the reaction, cyanates of the alkali metals being formed. Subsequently the mass in the tube is heated up to a bright red heat and now the charcoal enters into the reaction, the cyanates being reduced to cyanids and carbonic acid eliminated.

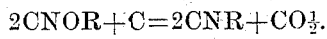

In order to obtain for instance pure cyanid of potassium, charcoal mixed with carbonate of potash is treated with ammonia as aforesaid and the melted mass, after cooling, is either extracted direct with alcohol or it is systematically treated with water and from this solution the cyanid of potassium is separated by gradually increasing the percentage of carbonate of potash or caustic potash in the solution. In this manner a larger or smaller quantity of the cyanid of potassium will be separated in the crystallized form.

In order to carry out the process described I use an apparatus of which the following is a description.

Figure 2:
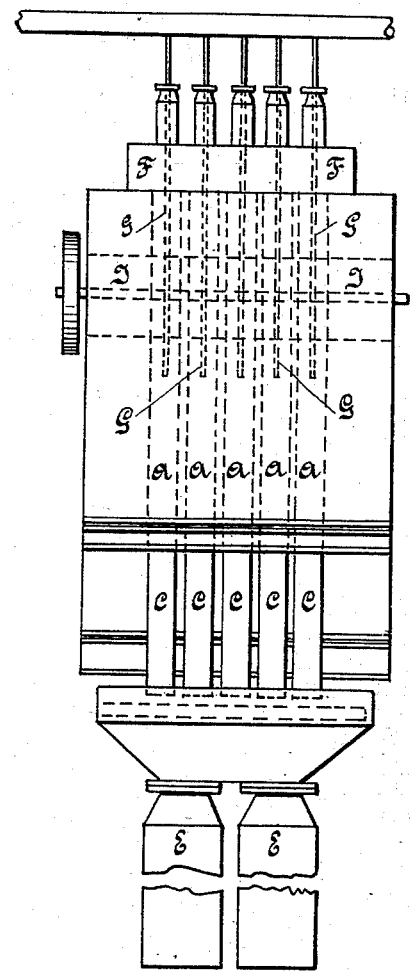
Figure 3:
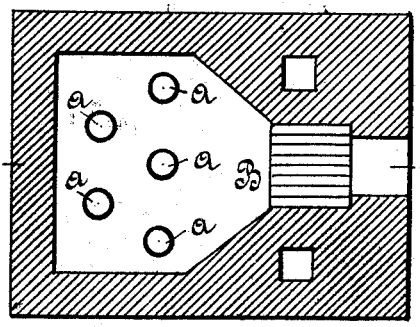

In the accompanying drawings—Figure 1, is a sectional view of the apparatus taken vertically on the line $o$—$p$ of Fig. 3. Fig. 2, is a view in elevation looking at the left hand side of Fig. 1. Fig. 3, is a cross section of Fig. 1 on line $m$—$n$.

In these figures the furnace is shown at B, the retorts at A, the horizontal partition wall forming a circuitous passage at L, the filling funnels at F, and the supply pipe for the ammonia at G. The lower ends of the retorts A are used as cooling tubes C emptying upon a belt D in a receiver E. There are one or more retorts A in the furnace.

The process is carried out as follows: The retorts A are filled with a mixture of charcoal and alkaline carbonates by means of the funnel F; and the lower end of the pipe G is pushed down to the point where the bright red heat has changed into the dark red heat. After this a regular stream of ammonia is introduced through the pipe G and the reaction mass is slowly let off into the general receiver E and is treated in the manner described. The mixture of the alkaline carbonates and charcoal is dried in a rotary drum which becomes heated sufficiently by the heating gases which escape from the furnace.

I claim—

1. The herein described process for separating the cyanates of the alkali metals consisting in subjecting the alkaline carbonates to a dark red heat in the presence of ammonia.

2. The herein described process of making cyanids consisting in mixing the alkaline carbonates with powdered charcoal, subjecting the mixture to a dark red heat in the presence of ammonia and subsequently heating the mass to a bright red heat, substantially as described.

3. The herein described process for separating the cyanid of potassium from its aqueous solution by gradually increasing the percentage of carbonate of potash or caustic potash in the solution.

4. In combination with a furnace chamber, a horizontal division wall therein forming an upper and lower chamber with a passage between, and retorts passing through both chambers, and through the lower wall thereof and the inlet pipe G entering the top of said retorts, substantially as described.

In testimony whereof I have hereunto set my hand in the presence of two subscribing witnesses.

WILHELM SIEPERMANN.

Witnesses:
W. HAUPT,
C. MANHEIM.